United States Patent
Kumar et al.

(10) Patent No.: US 11,195,533 B2
(45) Date of Patent: Dec. 7, 2021

(54) SYSTEMS AND METHODS FOR INCREMENTAL NATURAL LANGUAGE UNDERSTANDING

(71) Applicant: Disney Enterprises, Inc., Burbank, CA (US)

(72) Inventors: Komath Naveen Kumar, Los Angeles, CA (US); James R. Kennedy, Glendale, CA (US); Salvator D. Lombardo, Glendale, CA (US); Prashanth Gurunath Shivakumar, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 71 days.

(21) Appl. No.: 16/829,384

(22) Filed: Mar. 25, 2020

(65) Prior Publication Data

US 2021/0304773 A1 Sep. 30, 2021

(51) Int. Cl.
*G10L 15/00* (2013.01)
*G10L 17/00* (2013.01)
(Continued)

(52) U.S. Cl.
CPC .............. *G10L 17/00* (2013.01); *G06F 3/013* (2013.01); *G06K 9/00335* (2013.01); *G06K 9/00711* (2013.01)

(58) Field of Classification Search
CPC .............. G06F 3/013; G06K 9/00335; G06K 9/00711; G10L 17/00
(Continued)

(56) References Cited

U.S. PATENT DOCUMENTS

| 8,423,363 | B2 * | 4/2013 | Gupta | G10L 15/22 704/255 |
| 8,612,892 | B2 * | 12/2013 | Danton | G06F 3/04886 715/853 |

(Continued)

OTHER PUBLICATIONS

"Can I finish? Learning when to respond to incremental interpretation results in interactive dialogue" by David DeVault, Kenji Sagae, and David Traum. (ACL 2009).

(Continued)

*Primary Examiner* — Khai N. Nguyen
(74) *Attorney, Agent, or Firm* — Farjami & Farjami LLP

(57) ABSTRACT

A system for incremental natural language understanding includes a media module, a memory storing a software code, and a hardware processor communicatively coupled to the media module. The hardware processor is configured to execute the software code to receive an audio stream including a first utterance, and generate a first and second incremental speech recognition outputs based on first and second portions of the first utterance. In addition, the hardware processor is configured to execute the software code to determine, prior to generating the second incremental speech recognition output, a first intent of the first utterance based on the first incremental speech recognition output. The hardware processor is further configured to execute the software code to retrieve a first resource based on the determined first intent, and incorporate the first resource in the media content to be played by the media module.

20 Claims, 3 Drawing Sheets

(51) Int. Cl.
*G06K 9/00* (2006.01)
*G06F 3/01* (2006.01)

(58) Field of Classification Search
USPC .......................................................... 704/257
See application file for complete search history.

(56) References Cited

U.S. PATENT DOCUMENTS

| | | | | |
|---|---|---|---|---|
| 8,909,512 B2* | 12/2014 | McGraw | ............. | H01L 21/6831 |
| | | | | 704/2 |
| 9,015,048 B2* | 4/2015 | Arizmendi | .......... | G10L 15/1822 |
| | | | | 704/270.1 |
| 9,361,883 B2* | 6/2016 | Paek | ........................ | G10L 15/22 |
| 9,530,412 B2* | 12/2016 | Selfridge | ................. | G10L 15/22 |
| 10,102,851 B1* | 10/2018 | Kiss | ..................... | G10L 15/1822 |
| 10,157,313 B1* | 12/2018 | Zhang | ................. | A61B 1/00006 |
| 10,203,794 B1* | 2/2019 | Smith | .................... | G06F 1/1643 |
| 10,430,157 B2* | 10/2019 | Lee | ........................... | G10L 15/22 |
| 10,682,038 B1* | 6/2020 | Zhang | ................. | A61B 1/3132 |
| 10,714,077 B2* | 7/2020 | Song | ....................... | G06N 3/0445 |
| 10,733,275 B1* | 8/2020 | Knas | ...................... | G06F 21/32 |
| 10,755,096 B2* | 8/2020 | Zhang | ........................ | G06T 7/90 |
| 10,893,043 B1* | 1/2021 | John | ..................... | G06F 21/6245 |
| 11,042,649 B1* | 6/2021 | John | ........................ | G06F 21/32 |
| 2010/0179811 A1* | 7/2010 | Gupta | ..................... | G10L 15/22 |
| | | | | 704/235 |
| 2010/0280828 A1* | 11/2010 | Fein | ........................ | G10L 15/26 |
| | | | | 704/246 |
| 2010/0325587 A1* | 12/2010 | Danton | ............... | G06F 3/04886 |
| | | | | 715/853 |
| 2013/0110492 A1* | 5/2013 | McGraw | .................. | G03F 7/707 |
| | | | | 704/2 |
| 2013/0297307 A1* | 11/2013 | Paek | ....................... | G10L 15/26 |
| | | | | 704/235 |
| 2014/0156268 A1* | 6/2014 | Arizmendi | .......... | G10L 15/1822 |
| | | | | 704/231 |
| 2015/0002389 A1* | 1/2015 | Lefebvre | ................. | G06F 3/038 |
| | | | | 345/156 |
| 2016/0054807 A1* | 2/2016 | Flagg | .................... | G06F 3/0484 |
| | | | | 345/158 |
| 2016/0063992 A1* | 3/2016 | Selfridge | ................ | G10L 15/22 |
| | | | | 704/254 |
| 2016/0210115 A1* | 7/2016 | Lee | ......................... | G06F 3/167 |
| 2017/0025119 A1* | 1/2017 | Song | ....................... | G10L 15/16 |
| 2019/0213382 A1* | 7/2019 | Zhang | ................ | A61B 1/00006 |
| 2020/0357412 A1* | 11/2020 | Robert Jose | ............ | G10L 15/22 |

OTHER PUBLICATIONS

"Incremental Interpretation and Prediction of Utterance Meaning for Interactive Dialogue" by David DeVault, Kenji Sagae, and David Traum. (Dialogue and Discourse 2011).

"Incremental Dialogue Understanding and Feedback for Multiparty, Multimodal Conversation" by David Traum, David DeVault, Jina Lee, ZhiyangWang, and Stacy Marsella. (2012).

"Turn-taking phenomena in incremental dialogue systems" by Hatim Khouzaimi, Romain Laroche, and Fabrice Lef evre. (ACL 2015).

European Search Report in EP Application Serial No. 20214009.1.

* cited by examiner

SYSTEMS AND METHODS FOR INCREMENTAL NATURAL LANGUAGE UNDERSTANDING

BACKGROUND

Spoken Language Understanding (SLU) typically comprises of an automatic speech recognition (ASR) followed by a natural language understanding (NLU) module. The two modules process signals in a blocking sequential fashion, i.e., the NLU often has to wait for the ASR to finish processing on an utterance. In a real-time application scenario, the ASR receives a stream of continuous speech signals and outputs corresponding transcriptions. Due to the computational complexity and memory constraints, most ASRs typically operate by chunking and processing the speech in segments. This process is often referred to as end-pointing, and is usually determined based on different heuristics related to duration of inter-pausal units (IPUs), with the goal to minimize disruption during speech. Finally, the ASR outputs a transcript corresponding to each speech segment. As a result, any NLU application operating on the output of the ASR needs to wait at least until end-pointing, which gives rise to a fundamental bottleneck in latency, and potentially renders the spoken interaction less naturally.

SUMMARY

There are provided systems and methods for incremental natural language understanding, substantially as shown in and/or described in connection with at least one of the figures, and as set forth more completely in the claims.

DETAILED DESCRIPTION

Figure 1:
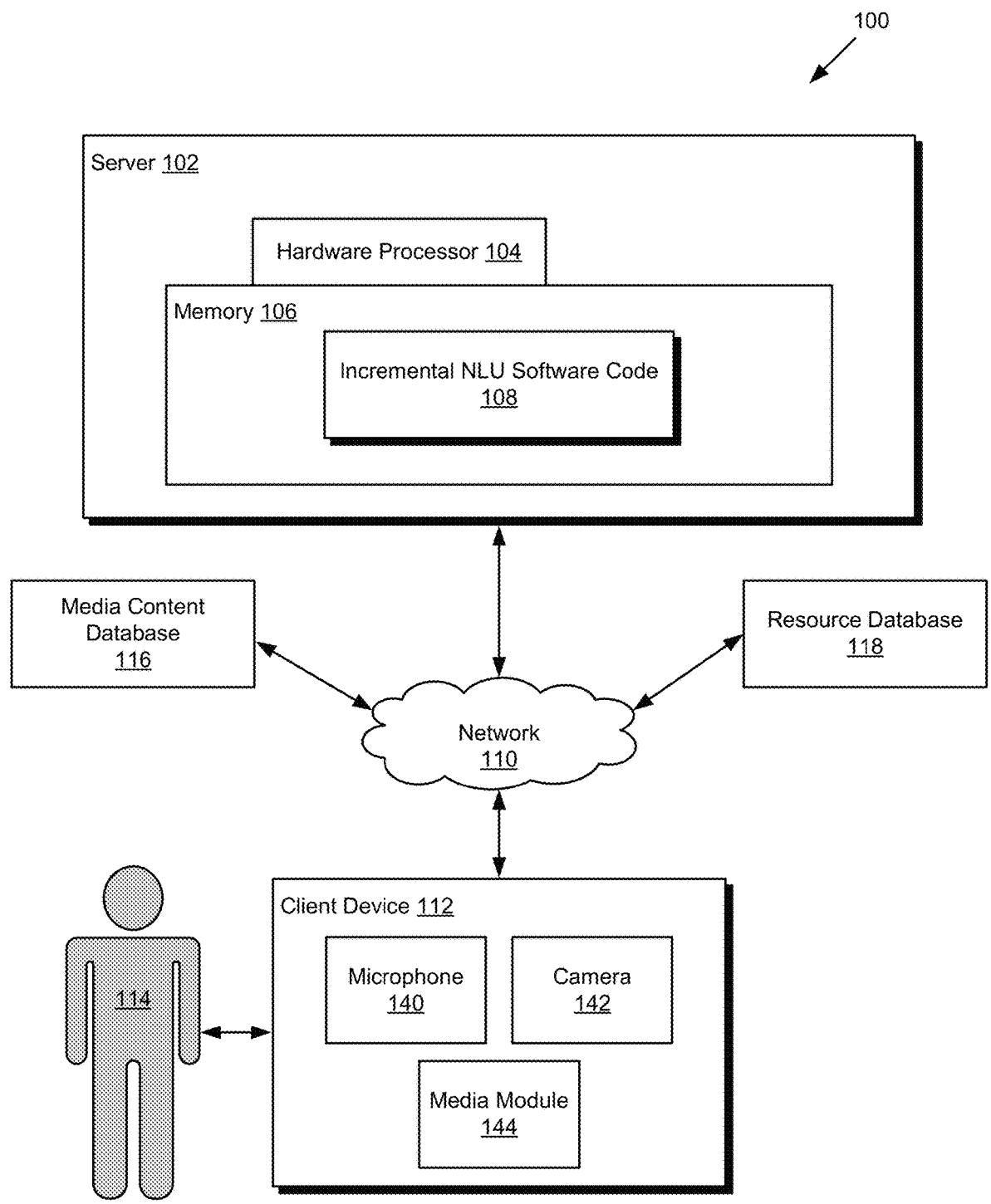
FIG. 1 shows a diagram of an exemplary system configured to incorporate resources in media content based on incremental natural language understanding, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system configured to incorporate resources in media content based on incremental natural language understanding, according to one implementation. As shown in FIG. 1, exemplary system 100 includes server 102 having hardware processor 104 and system memory 106 implemented as a non-transitory storage device storing incremental natural language understanding (NLU) software code 108. In addition, system 100 includes client device 112 having microphone 140, camera 142, and media module 144. Also shown in FIG. 1 are network 110, media content database 116, resource database 118, as well as user 114.

Client device 112 is configured to generate an audio stream including utterances. In one implementation, user 114 may interact with client device 112 by speaking utterances, and microphone 140 may generate an audio stream including the utterances. It is noted that microphone 140 may be implemented using multiple microphones, such as a microphone array, rather than an individual microphone. In another implementation, media module 144 may generate an audio stream including utterances based on an audio track of media content to be played by media module 144. In various implementations, client device 112 may be a smartphone, smartwatch, tablet computer, laptop computer, personal computer, smart TV, home entertainment system, or gaming console, to name a few examples. In one implementation, client device 112 may be a voice modulator in a costume mask. As another example, client device 112 may take the form of a kiosk in a theme park.

Client device 112 may also be configured to generate video data. User 114 may interact with client device 112 by gazes and gestures, and camera 142 may generate video data including the gazes and gestures. It is noted that camera 142 may be implemented using multiple cameras rather than an individual camera. In another implementation, media module 144 may generate video data including gazes or gestures based on a video track of media content to be played by media module 144.

As described further below, media module 144 of client device 112 is configured to play a media content. In one implementation, media content to be played by media module 144 may be received from media content database 116 via network 110. In another implementation, media content to be played by media module 144 may be generated by media module 144 or client device 112, for example, based on audio or video data received from microphone 140 and/or camera 142 respectively. Although client device 112 in FIG. 1 is shown to include microphone 140, camera 142, and media module 144, it is noted that any of microphone 140, camera 142, and media module 144 may be separate from each other, for example, as standalone devices communicatively coupled to each other and/or to network 110.

According to the exemplary implementation shown in FIG. 1, server 102, client device 112, media content database 116, and resource database 118 are communicatively coupled via network 110. Network 110 enables communication of data between server 102, client device 112, media content database 116, and resource database 118. Network 110 may correspond to a packet-switched network such as the Internet, for example. Alternatively, network 110 may correspond to a wide area network (WAN), a local area network (LAN), or included in another type of private or limited distribution network. Network 110 may be a wireless network, a wired network, or a combination thereof. Server 102, client device 112, media content database 116, and resource database 118 may each include a wireless or wired transceiver enabling transmission and reception of data.

Media content database 116 provides media content to be played by media module 144. Media content may include movie content, television programming content, or videos on demand (VODs), for example, including ultra high-definition (ultra HD), HD, or standard-definition (SD) baseband video with embedded audio, captions, timecode, and other ancillary data, such as ratings and/or parental guidelines. In some implementations, media content may include multiple audio tracks, and may utilize secondary audio programming (SAP) and/or Descriptive Video Service (DVS), for example. It is noted that although FIG. 1 depicts media content database 116 as a standalone component, in other implementations, media content database 116 may be included in one or more computing platforms. For example, media content database 116 may be included in a media content distribution platform, or may reside in memory 106 of server 102 or in client device 112.

Hardware processor 104 of server 102 is configured to execute incremental NLU software code 108 to receive an audio stream including utterances from client device 112 via network 110. Hardware processor 104 may also be configured to execute incremental NLU software code 108 to receive video data including gazes and gestures from client device 112 via network 110. As will be described in greater detail below, hardware processor 104 may be further configured to execute incremental NLU software code 108 to generate incremental speech recognition outputs based on portions of the utterances, as well as to generate incremental gaze recognition outputs or incremental gesture recognition outputs based on portions of the video data.

Hardware processor 104 may be the central processing unit (CPU) for server 102, for example, in which role hardware processor 104 runs the operating system for server 102 and executes incremental NLU software code 108. Hardware processor 104 may also be a graphics processing unit (GPU) or an application specific integrated circuit (ASIC). Memory 106 may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as hardware processor 104 of server 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, RAM, programmable read-only memory (PROM), erasable PROM (EPROM), and FLASH memory.

It is noted that although FIG. 1 depicts incremental NLU software code 108 as being located in memory 106, that representation is merely provided as an aid to conceptual clarity. More generally, server 102 may include one or more computing platforms, such as computer servers for example, which may be co-located, or may form an interactively linked but distributed system, such as a cloud based system, for instance. As a result, hardware processor 104 and memory 106 may correspond to distributed processor and memory resources within system 100. Thus, it is to be understood that incremental NLU software code 108 may be stored remotely within the distributed memory resources of system 100.

As will be described in greater detail below, hardware processor 104 is configured to execute incremental NLU software code 108 to retrieve resources, such as audio, video, and other resources. Hardware processor 104 is further configured to execute incremental NLU software code 108 to incorporate the resources in media content to be played by media module 144. In one implementation, server 102 may retrieve resources to be incorporated into media content from resource database 118 via network 110. It is noted that although FIG. 1 depicts resource database 118 as a standalone component, in other implementations, resource database 118 may be included in one or more computing platforms. For example, resource database 118 may reside in memory 106 of server 102 or in client device 112.

Figure 2:
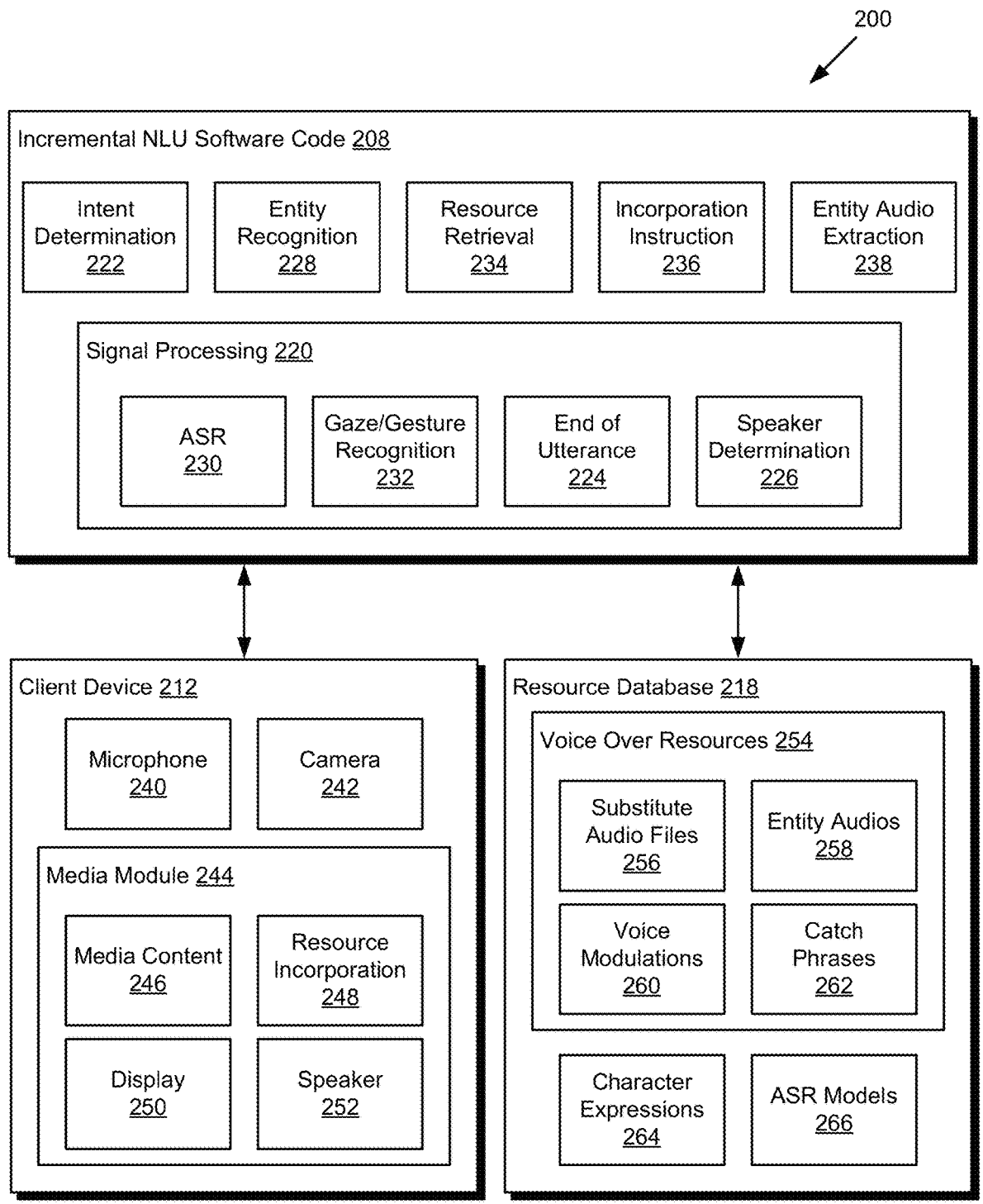
FIG. 2 shows a more detailed diagram of an exemplary system configured to incorporate resources in media content based on incremental natural language understanding, according to one implementation.

FIG. 2 shows a more detailed diagram of an exemplary system configured to incorporate resources in media content based on incremental natural language understanding, according to one implementation. According to the present exemplary implementation, system 200 includes incremental NLU software code 208, client device 212, and resource database 218. Incremental NLU software code 208 includes modules for signal processing 220, intent determination 222, entity recognition 228, resource retrieval 234, incorporation instruction 236, and entity audio extraction 238. Signal processing 220 includes modules for automatic speech recognition (ASR) 230, gaze/gesture recognition 232, end of utterance 224, and speaker determination 226. Client device 212 includes microphone 240, camera 242, and media module 244. Media module 244 includes media content 246, resource incorporation 248, display, 250, and speaker 252. Resource database 218 includes voice over resources 254, character expressions 264, and ASR models 266. Voice over resources 254 include substitute audio files 256, entity audios 258, voice modulations 260, and catch phrases 262.

System 200, incremental NLU software code 208, client device 212, resource database 218, microphone 240, camera 242, and media module 244 in FIG. 2 correspond respectively in general to system 100, incremental NLU software code 108, client device 112, resource database 118, microphone 140, camera 142, and media module 144 in FIG. 1, and those corresponding features may share any of the characteristics attributed to either corresponding feature by the present disclosure. Thus, although not explicitly shown in FIG. 1, like incremental NLU software code 208 in FIG. 2, incremental NLU software code 108 in FIG. 1 includes features corresponding to signal processing 220, intent determination 222, entity recognition 228, resource retrieval 234, incorporation instruction 236, and entity audio extraction 238.

Figure 3:
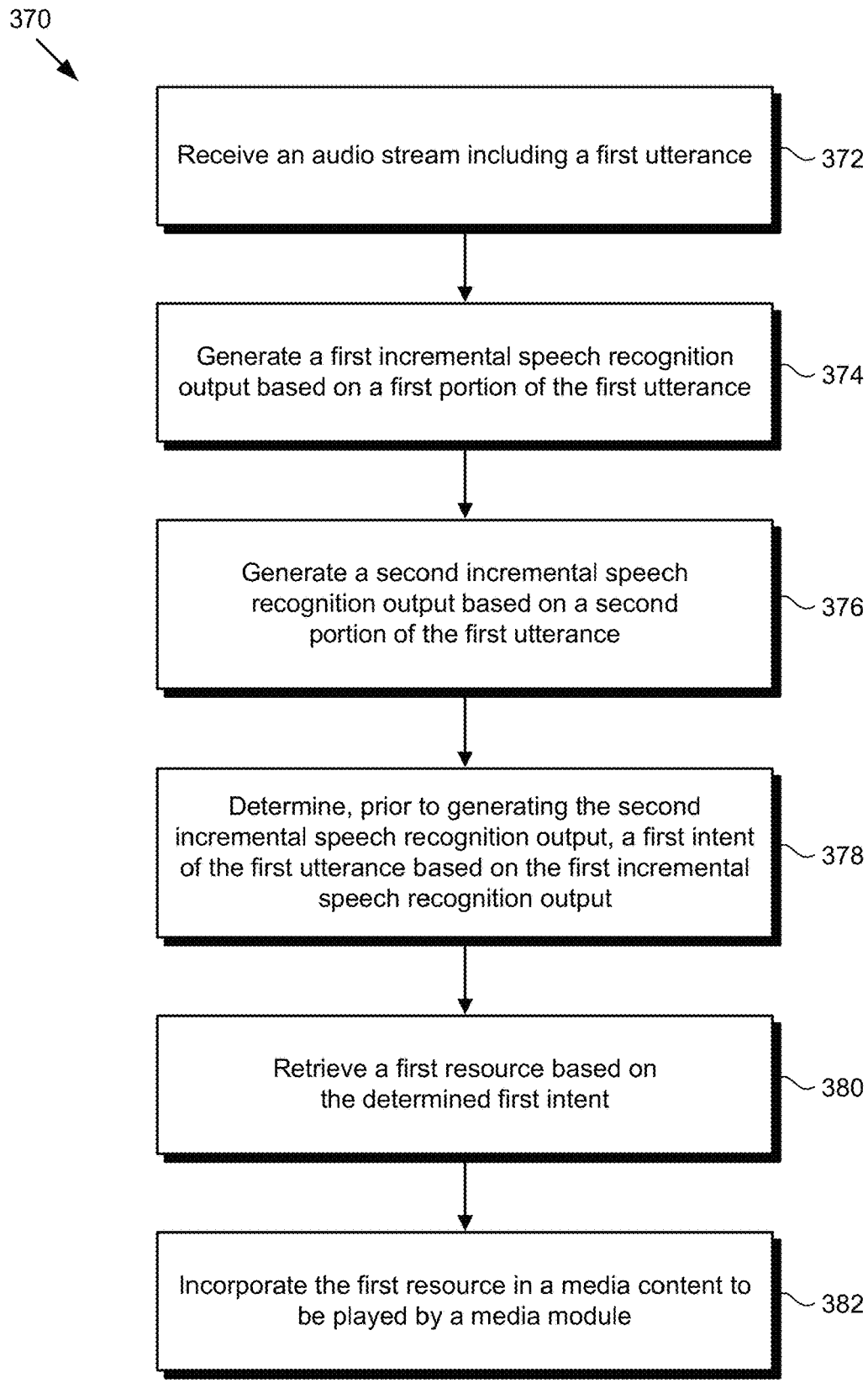
FIG. 3 is a flowchart presenting an exemplary method for use by a system to incorporate resources in media content based on incremental natural language understanding, according to one implementation.

The functionality of system 100/200 will be further described by reference to FIG. 3 in combination with FIGS. 1 and 2. FIG. 3 shows flowchart 370 presenting an exemplary method for use by a system to incorporate resources in media content based on incremental natural language understanding, according to one implementation. With respect to the method outlined in FIG. 3, it is noted that certain details and features have been left out of flowchart 370 in order not to obscure the discussion of the inventive features in the present application.

Flowchart 370 begins at action 372 with receiving an audio stream including a first utterance. The audio stream may be received by incremental NLU software code 108/208 from client device 112/212 via network 110. The utterance may be any form of speech. For example, the utterance may be a sentence including multiple words. As another example, the utterance may be a dialogue between two or more entities. As yet another example, the utterance may be a song verse including multiple lyrics. It is noted that the audio stream may include multiple utterances. As described above, the audio stream may be generated in various ways. In one implementation, user 114 may interact with client device 112/212 by speaking utterances, and microphone 140/240 may generate an audio stream including the utterances. In another implementation, media module 144/244 may generate an audio stream including utterances based on an audio track of media content 246 to be played by media module 144/244.

Incremental NLU software code 108/208 may also receive video data from client device 112/212 via network 110. As described above, the video data may be generated in various ways. In one implementation, user 114 may interact with client device 112/212 by gazes and gestures, and camera 142/242 may generate video data including the gazes and gestures. Camera 142/242 may include one or more still cameras, such as single shot cameras, and/or one or more video cameras configured to capture multiple video frames in sequence. Camera 142/242 may be a digital camera including a complementary metal-oxide-semiconductor (CMOS) or charged coupled device (CCD) image sensor. Camera 142/242 may also include an infrared camera. In another implementation, media module 144/244 may generate video data including gazes or gestures based on a video track of media content 246 to be played by media module 144/244.

Flowchart 370 continues at action 374 with generating a first incremental speech recognition output based on a first portion of the first utterance. The first incremental speech recognition output may be generated by ASR 230 processing the audio stream received from client device 112/212. In various implementations, ASR 230 may filter background noise, normalize volume, and break down the audio stream into recognized phonemes. ASR 230 may also perform a statistical probability analysis using the phonemes to deduce a whole word. Where the utterance is a sentence, the first portion of the utterance may be, for example, the first word in the sentence, and the first incremental speech recognition output may be a transcript corresponding to the first word of the sentence. In another implementation, the first incremental speech recognition output may be based on a first group of words in the sentence. More generally, the first incremental speech recognition output may be based on any portion shorter than the entirety of the utterance. As used herein, the terms "first incremental speech recognition output" and "second incremental speech recognition output" are defined relative to each, and refer to one output preceding generation of the other output. These terms do not require an output to be the first output generated by ASR 230 in an absolute temporal sense. For example, the "first incremental speech recognition output" may technically be the fourth incremental speech recognition output generated by ASR 230, while the "second incremental speech recognition output" may technically be the seventh incremental speech recognition output generated by ASR 230.

Incremental NLU software code 108/208 may also generate a first incremental gaze recognition output or a first incremental gesture recognition output based on a first portion of video data. The first incremental gaze recognition output and/or the first incremental gesture recognition output may be generated by gaze/gesture recognition 232 processing video data from client device 112/212. For example, gaze/gesture recognition 232 may utilize a pupil center corneal reflection method to recognize an eye gaze as the first incremental gaze recognition output. As another example, gaze/gesture recognition 232 may recognize a predetermined hand gesture or a predetermined bodily pose as the first incremental gesture recognition output. Gaze/gesture recognition 232 may also correlate gaze and gesture information. For example, gaze/gesture recognition 232 may improve the accuracy of a recognized eye gaze using a corresponding head position. As used herein, the terms "first incremental gaze/gesture recognition output" and "second incremental gaze/gesture recognition output" are relative terminology, and do not impose an absolute temporal requirement, as described above.

Flowchart 370 continues at action 376 with generating a second incremental speech recognition output based on a second portion of the first utterance. ASR 230 may generate the second incremental speech recognition output in action 376 in a similar manner as the first incremental speech recognition output in action 374, albeit using the second portion of the first utterance. For example, where the utterance is a sentence, the second portion of the utterance may be the second word in the sentence, and the second incremental speech recognition output may be a transcript corresponding to the second word of the sentence. In other examples, the second incremental speech recognition output may correspond to another word of the sentence because, as described above, the terms "first" and "second" are relative terminology, and do not impose an absolute temporal requirement. Advantageously, ASR 230 of incremental NLU software code 108/208 begins generating incremental speech recognition outputs as soon as portions of an utterance are received, rather than waiting until receiving the entirety of an utterance. As described further below, hardware processor 104 can execute incremental NLU software code 108/208 to perform various actions prior to ASR 230 generating a second incremental speech recognition output. As also described below, hardware processor 104 can execute incremental NLU software code 108/208 to update actions based in part on the second incremental speech recognition output. Gaze/gesture recognition 232 may also generate a second incremental gaze recognition output and/or a second incremental gesture recognition output in a similar manner as the first incremental gaze recognition output and/or the first incremental gesture recognition output, albeit using a later portion of video data from client device 112/212.

Flowchart 370 continues at action 378 with determining, prior to generating the second incremental speech recognition output, a first intent of the first utterance based on the first incremental speech recognition output. Intent determination 222 may determine the first intent of the first utterance. In one implementation, intent determination 222 determines that the first intent of the first utterance includes impersonating a character. For example, the first incremental speech recognition output may be a word in a catch phrase associated with a particular movie character or cartoon character. Based on the recognized word, intent determination 222 may determine that the first intent of the first utterance may be to impersonate that particular movie character or cartoon character, or to complete the catch phrase. Intent determination 222 may utilize a probabilistic model to determine the first intent. Intent determination 222 may be trained on several possible intents, and may generate confidence scores based on the first incremental speech recognition output for each of the several possible intents. Intent determination 222 may determine the first intent of the first utterance to be, for example, the intent corresponding to the highest confidence score. In one implementation, intent determination 222 may determine multiple intents of the first utterance based on the first incremental speech recognition output. For example, intent determination 222 may determine that the first utterance has two intents corresponding to the two highest confidence scores. As another example, intent determination 222 may determine that a first intent of the first utterance corresponds to the highest confidence score, and that subsequent intents of the first utterance correspond to confidence scores that exceed a threshold. As used herein, the term "first intent" refers to an intent corresponding to the first incremental speech recognition output. This term does not require an intent to be the first intent determined by intent determination 222 in an absolute temporal sense. For example, the "first intent" may technically be the fourth intent determined by intent determination 222.

In one implementation, intent determination 222 determines that the first intent of the first utterance includes a predetermined word. For example, the first incremental speech recognition output may be a word associated with or commonly preceding a particular predetermined word. Based on the recognized word, intent determination 222 may determine that the first intent of the first utterance includes that particular predetermined word. A predetermined word may be any word for which intent determination 222 is trained. In one implementation, a predetermined word can be a prohibited word, such as a curse word. Upon determining that the first intent of the first utterance includes a prohibited word, intent determination 222 may estimate a starting point of the prohibited word in the first utterance, and may also estimate a duration of the prohibited word in the first utterance. In this implementation, intent determination 222 estimates the starting point and duration of the prohibited word prior to the prohibited word occurring in the first utterance, based on the first incremental speech recognition output. Estimating the starting point or the duration of the prohibited word in the first utterance can include determining intervening words between the first portion of the first utterance and the prohibited word, and/or determining a rate of speech based on the first incremental speech recognition output. Although the example described above refers to a predetermined word, it is noted that intent determination 222 may determine that the first intent of the first utterance includes a predetermined phrase.

In one implementation, intent determination 222 determines that the first intent of the first utterance includes singing a song. For example, the first incremental speech recognition output may be a lyric of a song. In one implementation, intent determination 222 determines that the first intent of the first utterance includes a personal introduction. For example, the first incremental speech recognition output may be a word associated with or commonly preceding user 114 introducing their name. In various implementations, intent determination 222 determines that the first intent of the first utterance includes enabling subtitles, foreign language audio tracks, or other assistive features for media content 146/246 played by media module 144/244. In one implementation, intent determination 222 determines that the first intent of the first utterance includes enabling a foreign language mode on client device 112/212.

Prior to generating the second incremental gaze recognition output or the second incremental gesture recognition output, intent determination 222 may determine the first intent of the first utterance further based on the first incremental gaze recognition output or the first incremental gesture recognition output. For example, intent determination 222 may determine the first intent from several possible intents based on whether an eye gaze of user 114 was directed toward camera 142/242 of client device 112/212 while speaking the first portion of the first utterance. As another example, intent determination 222 may determine the first intent from several possible intents based on whether user 114 made a predetermined hand gesture or a predetermined bodily pose while speaking the first portion of the first utterance.

Intent determination 222 may determine the first intent of the first utterance further based on a determined first speaker corresponding to the first incremental speech recognition output. Speaker determination 226 of signal processing 220 may determine the first speaker corresponding to the first incremental speech recognition output. For example, speaker determination 226 may determine that user 114 corresponds to the first incremental speech recognition output by correlating unique voice patterns of the first incremental speech recognition output with unique voice patterns of user 114 stored in memory 106. Alternatively, where user 114 is a new user, speaker determination 226 may create a new profile for user 114 in memory 106 that includes the unique voice patterns of the first incremental speech recognition output. Speaker determination 226 may also determine a first speaker using facial recognition of gaze/gesture recognition 232. For example, by correlating timestamps for a facial recognition from output gaze/gesture recognition 232 with timestamps for the first incremental speech recognition output, speaker determination 226 may determine that user 114 corresponds to the first incremental speech recognition output. Intent determination 222 may then utilize outputs of speaker determination 226. For example, intent determination 222 may determine the first intent from several possible intents based on whether user 114 or another speaker corresponds to the first incremental speech recognition output.

Entity recognition 228 may recognize an entity in the audio stream for preservation of audio data, such as pronunciation and intonation. Entity recognition 228 may recognize the entity from a list of predetermined entities stored in memory 106. Alternatively, entity recognition 228 may utilize outputs of intent determination 222 and/or ASR 230 to recognize the entity. For example, the first incremental speech recognition output may include user 114 introducing their name. Where intent determination 222 determines that the first intent of the first utterance includes a personal introduction, and ASR 230 outputs a transcript that does not include a dictionary word or assigns the transcript a high error value, entity recognition 228 may recognize that the transcript includes a name. Upon determining that first incremental speech recognition output includes a name, entity recognition 228 may instruct entity audio extraction 238 to extract an audio portion corresponding to the recognized name from the first portion of the first utterance. For example, the first portion of the first utterance may be temporarily stored by incremental NLU software code 108/208, and entity audio extraction 238 may extract an audio portion including phonemes or other audio data corresponding to the recognized name from the first portion of the first utterance for permanent storage. Entity audio extraction 238 may then instruct incremental NLU software code 108/208 to store the extracted audio portion, for example, in resource database 118/218. Although the example described above refers to recognizing a name, an entity recognized by entity recognition 228 and extracted by entity audio extraction 238 can be any word or phrase for preservation of audio data, such as a title, proper noun, interjection, or word commonly spoken with two different pronunciations.

Flowchart 370 continues at action 380 with retrieving a first resource based on the determined first intent. The first resource may be retrieved from resource database 118/218 by resource retrieval 234 via network 110. Resource retrieval 234 may formulate a resource retrieval request, and may then instruct incremental NLU software code 108/208 to transmit the resource retrieval request to resource database 118/218, for example, using a wireless transmitter.

Resource database 118/218 may identify the first resource among resources stored therein based on a retrieval request, and may transmit the first resource to incremental NLU software code 108/208. As used herein, the term "first resource" refers to a resource corresponding to the first intent. This term does not require a resource to be the first resource retrieved by resource retrieval 234 in an absolute temporal sense. For example, the "first resource" may technically be the fourth resource retrieved by resource retrieval 234.

Where the determined first intent of the first utterance includes a prohibited word, the first resource retrieved by resource retrieval 234 may be one of substitute audio files 256. Substitute audio files 256 may include high pitch bleeps such as those commonly used to censor prohibited words on television or radio broadcasts. In other implementations, substitute audio files 256 may include any type of audio signal. In one implementation, a duration of the retrieved substitute audio file is approximately the duration of the prohibited word, as estimated by intent determination 222. For example, resource retrieval 234 may include the estimated duration of the prohibited word in a resource retrieval request transmitted to resource database 118/218, and resource database 118/218 may be configured to determine one of substitute audio files 256 having a duration that most closely matches the estimated duration of the prohibited word.

Where the determined first intent of the first utterance includes pronunciation of a user's name, such as in a personalized message, the first resource retrieved by resource retrieval 234 may be one of entity audios 258 corresponding to that particular user. For example, the retrieved entity audio may be an audio portion including the correct pronunciation of the name of user 114, as extracted by entity audio extraction 238. Where the determined first intent of the first utterance is to impersonate a particular movie character or cartoon character, the first resource retrieved by resource retrieval 234 may be one of voice modulations 260 corresponding to that particular movie or cartoon character. Voice modulations 260 can include instructions for pitch shifting, distorting, and filtering audio data. For example, voice modulations 260 can include instructions for transforming audio data to be similar to unique voice patterns of the particular movie or cartoon character. Where the determined first intent of the first utterance is to complete a catch phrase of a particular movie character or cartoon character, the first resource retrieved by resource retrieval 234 may be one of catch phrases 262 corresponding to that particular movie character or cartoon character.

Voice over resources 254 can include other resources not depicted in FIG. 2. For example, where the determined first intent of the first utterance is to sing a song, the first resource retrieved by resource retrieval 234 may be the particular song, or an instrumental accompaniment omitting the audio lyrics of the particular song. It is noted that although substitute audio files 256, voice modulations 260, entity audios 258, and catch phrases 262 are depicted as voice over resources 254 in the present implementation, in various implementations, resources in resource database 218 may take any form including text, video, or any resource capable of being incorporated in media content 246 to be played by media module 144/244, as described further below. For example, where the determined first intent of the first utterance includes enabling a foreign language mode on client device 112/212, the first resource retrieved by resource retrieval 234 may be the subtitles or foreign language audio tracks. As another example, where the determined first intent of the first utterance includes interacting with a virtual character, such as a virtual character displayed on display 250, the first resource retrieved by resource retrieval 234 may be one of character expressions 264. Character expressions 264 may be videos or 2D or 3D model animations of a virtual character performing various actions, such as frowning or jumping. In one implementation, resource retrieval 234 may retrieve multiple resources based on the determined first intent.

Incremental NLU software code 108/208 may also retrieve resources based on the determined first intent where the resources are not specifically for incorporation in media content 246 to be played by media module 144/244. For example, where the determined first intent of the first utterance includes enabling a foreign language mode on client device 112/212, the first resource retrieved by resource retrieval 234 may be one of ASR models 266. ASR 230 may employ the retrieved ASR model to process the audio stream from client device 112/212 in a different manner. For example, different ASR models 266 can be employed to generate incremental speech recognition outputs for a language, dialect, or accent corresponding to the particular foreign language mode. As another example, in order to avoid biasing generated incremental speech recognition outputs towards common or expected words, such as words recognized in an official or predetermined dictionary, where the determined first intent of the first utterance includes a personal introduction, ASR 230 may employ the retrieved ASR model to negate or mitigate biasing of subsequently generated incremental speech recognition outputs towards a common or expected word, such that entity recognition 228 can more easily recognize an entity or name from the subsequently generated incremental speech recognition outputs. Incremental NLU software code 108/208 may retrieve one of ASR models 266 in addition to resources for incorporation in media content 246 to be played by media module 144/244, such as foreign language subtitles audio tracks, catch phrases, song files, etc. It is noted that although FIG. 2 depicts resources as residing in resource database 218, in some implementations, resources may reside in memory 106 of server 102.

Flowchart 370 continues at action 382 with incorporating the first resource in a media content to be played by a media module. The first resource may be incorporated in media content 246 to be played on media module 144/244. Media module 144/244 may be an application running on client device 112/212. Media module 144/244 includes media content 246, resource incorporation 248, display, 250, and speaker 252. Incorporation instruction 236 of incremental NLU software code 108/208 may provide instructions to resource incorporation 248 of media module 144/244 regarding how to incorporate the first resource in media content 246. Incorporation instruction 236 may also provide the first resource to media module 144/244. In one implementation, incorporation instruction 236 provides the instructions as metadata together with the first resource. Resource incorporation 248 of media module 144/244 parses the instructions and incorporates the first resource in media content 246. As described further below, incorporation of the first resource in media content 246 can entail replacing a portion of media content 246 with the first resource, playing the first resource along with media content 246, or other means of incorporation.

As described above, media content 246 may be movie content, television programming content, or VODs, for example, including ultra high-definition (ultra HD), HD, or standard-definition (SD) baseband video with embedded audio, captions, timecode, and other ancillary data, such as ratings and/or parental guidelines. In some implementations, media content 246 may include multiple audio tracks, and may utilize secondary audio programming (SAP) and/or Descriptive Video Service (DVS), for example. Media content 246 may be a live broadcast video. Media content 246 may also include 2D or 3D model animations. It is also noted that although FIG. 2 depicts media content 246 as residing on media module 144/244, in some implementations, media content 246 may reside in media content data base 116 (shown in FIG. 1) or in memory 106. In such implementations, media content 246 may be may be transmitted to media module 144/244 from media content database 116 or from memory 106 of server 102 (shown in FIG. 1). In another implementation, media content may be generated by media module 144/244 itself.

Media module 244 can play media content 246 and the first resource using display 250 and/or speaker 252. Display 250 may be implemented as a liquid crystal display (LCD), a light-emitting diode (LED) display, an organic light-emitting diode (OLED) display, or any other suitable display screen that performs a physical transformation of signals to light. Speaker 252 may be implemented as a micro-electrical mechanical systems (MEMS) speaker, a speaker array, or any other suitable speaker that performs a physical transformation of signals to sound. It is noted that although FIG. 2 depicts media module 244 as including a single display 250 and a single speaker 252, that representation is also merely provided as an aid to conceptual clarity. More generally, media module 244 may include one or more displays and/or speakers, which may be co-located, or interactively linked but distributed.

In one implementation, media content 246 is a live broadcast being played by media module 144/244 concurrently as it is generated by media module 144/244, for example, based on audio or video data received from microphone 140/240 and/or camera 142/242 respectively. Client device 112/212 may transmit an audio stream including the first utterance of the live broadcast to server 102. Where incremental NLU software code 108/208 determines that the first intent of the first utterance includes a prohibited word, one of substitute audio files 256 retrieved from resource database 118/218 may be substituted for the prohibited word. For example, as described above, intent determination 222 may estimate a starting point of the prohibited word in the live broadcast. Then incorporation instruction 236 and resource incorporation 248 can substitute an audio portion of the live broadcast including the prohibited word with the substitute audio file at the estimated started point. Thus, system 100/200 may censor a live broadcast without introducing a time delay and without requiring prior knowledge of the contents of the live broadcast.

In one implementation, client device 112/212 is a voice modulator and media content 246 is an audio stream being played by speaker 252 of media module 144/244 concurrently as it is generated by media module 144/244, for example, based on audio data received from microphone 140/240. Client device 112/212 may transmit the audio stream including a first utterance to server 102. Where incremental NLU software code 108/208 determines that the first intent of the first utterance is to impersonate a particular movie character or cartoon character, incorporation instruction 236 and resource incorporation 248 may apply one of voice modulations 260 corresponding to the particular movie or cartoon character retrieved from resource database 118/218 to the audio stream being played by speaker 252 of media module 144/244, the audio stream is transformed with unique voice patterns of the particular movie or cartoon character. Thus, system 100/200 may achieve voice modulation of subsequent portions of an audio stream after only receiving a first portion thereof. In one implementation, media module 144/244 may introduce a delay between microphone 140/240 generating the audio stream and speaker 252 of media module playing the audio stream, in order to retroactively apply one of voice modulations 260 to the first portion of the audio stream, which incremental NLU software code 108/208 utilized to determine the first intent and retrieve the corresponding one of voice modulations 260.

In one implementation, media content 246 played by media module 144/244 is a message personalized for user 114. Where incremental NLU software code 108/208 determines that the first intent of the first utterance includes utilizing the name of user 114, incorporation instruction 236 and resource incorporation 248 may incorporate one of entity audios 258 corresponding to user 114 retrieved from resource database 118/218 into the personalized message. In one implementation, an audio portion including the pronunciation of the recognized name of user 114, as extracted by entity audio extraction 238, is incorporated into the personalized message. In another implementation, text including the spelling of the name of user 114 is incorporated into the personalized message, for example, by display 250.

Media content 246 played by media module 144/244 may also be personalized by incorporating an audio portion corresponding to a recognized entity other than a name. For example, media content 246 played by media module 144/244 may be an audio encyclopedia or an interactive search engine. Where incremental NLU software code 108/208 determines that the first intent of the first utterance includes learning about or discussing pecans, incorporation instruction 236 and resource incorporation 248 may incorporate one of entity audios 258 retrieved from resource database 118/218, such that an audio portion including the user's specific pronunciation of the word "pecan" (e.g., "pee-can" versus "puh-can"), as extracted by entity audio extraction 238, is incorporated into an encyclopedia entry or search result. By the same token, any media content 246 playing audio for the word "Caribbean" may incorporate one of entity audios 258 having an accent on the first syllable (e.g., "KAR-i-bee-in) or one of entity audios 258 having an accent on the second syllable (e.g., "ka-RIB-ee-in) depending on the audio portion extracted by entity audio extraction 238.

In one implementation, media content 246 played by media module 144/244 is an interactive game that prompts user 114 to speak a catch phrase. Where the determined first intent of the first utterance is a catch phrase of a particular movie character or cartoon character, incorporation instruction 236 and resource incorporation 248 may incorporate one of catch phrases 262 corresponding to that particular movie character or cartoon character retrieved from resource database 118/218 into the interactive game. For example, media module 144/244 may display the retrieved catch phrase on display 250 as user 114 begins to speak the first word of the catch phrase. As another example, media module 144/244 may play the catch phrase using speaker 252.

In a similar implementation, media content 246 played by media module 144/244 is an interactive foreign language education program that prompts user 114 to speak a sentence in a foreign language. Where user 114 correctly pronounces the first word of the sentence in the foreign language, incremental NLU software code 108/208 may determine the first intent of the first utterance is to complete the sentence, and may incorporate appropriate resources in the foreign language education program. For example, media module 244 may display one or more remaining words of the foreign language sentence on display 250 as user 114 speaks the first word. As another example, media module 144/244 may play one or more remaining words of the foreign language sentence using speaker 252 so that user 114 may speak along.

In one implementation, media content 246 played by media module 144/244 is a karaoke application. Where user 114 sings the first lyric(s) of a song, incremental NLU software code 108/208 may determine that the first intent of the first utterance is to sing a particular song. Incorporation instruction 236 and resource incorporation 248 may incorporate appropriate resources corresponding to that particular song, which is retrieved from resource database 118/218 into the karaoke application. For example, media module 244 may play the particular song, or an instrumental accompaniment omitting the audio lyrics of the particular song, using speaker 252 as user 114 begins to sing the first lyric(s). As another example, media module 144/244 displays the remaining lyrics of the particular song on display 250.

In one implementation, media content 246 played by media module 144/244 is a movie. User 114 may begin speaking an utterance to microphone 140/240 commanding the client device 112/212 to enable a foreign language mode. When incremental NLU software code 108/208 determines that the first intent of the first utterance includes enabling the foreign language mode, incorporation instruction 236 and resource incorporation 248 may incorporate subtitles or foreign language audio tracks corresponding to the foreign language mode retrieved from resource database 118/218 into the movie via display 250 or speaker 252. Thus, system 100/200 achieves predictive voice-activated control for media module 144/244.

In one implementation, media content 246 played by media module 144/244 is an interactive story displaying virtual characters. Where the determined first intent of the first utterance includes describing an event that happens to the virtual characters, incorporation instruction 236 and resource incorporation 248 may incorporate one of character expressions 264 corresponding to the event retrieved from resource database 118/218 into the virtual character. For example, media module 144/244 may display 2D or 3D model animations of a virtual character performing a new action, such as frowning or jumping, on display 250. As another example, media module 144/244 may display a new virtual character corresponding to the event on display 250.

Advantageously, incremental NLU software code 108/208 begins processing as soon as the first portion of an utterance is recognized, rather than waiting until recognizing the entirety of an utterance. Thus, incremental NLU software code 108/208 may determine intents, retrieve resources, and incorporate resources in media content 246 with reduced latency.

As described above with respect to action 376, incremental NLU software code 108/208 may continue incremental processing by generating the second incremental speech recognition output based on the second portion of the first utterance in a similar manner as the first incremental speech recognition output. After generating the second incremental speech recognition output, intent determination 222 may update the first intent based on both the first and second incremental speech recognition outputs. For example, where user 114 begins to sing a first lyric that is shared by two songs and intent determination 222 determined that the first intent included singing the first song, after user 114 sings a second lyric that is specific to the second song, intent determination 222 may update the first intent to include singing the second song instead. In this example, resource retrieval 234 may retrieve a second resource from resource database 118/218 based on the updated first intent, and incorporation instruction 236 and resource incorporation 248 may incorporate the second resource in media content 246 being played by media module 144/244. In a similar manner, intent determination 222 may update the first intent of the first utterance using a second incremental gaze recognition output or a second incremental gesture recognition output.

However, where user 114 begins to sing a first lyric that is shared by two songs and intent determination 222 determined that the first intent included singing the first song, after user 114 sings a second lyric that is specific to the first song, intent determination 222 may update the first intent by assigning a higher confidence score to the first song. In this example, resource retrieval 234 need not retrieve a second resource from resource database 118/218. In various implementations, system 100/200 can request and receive confirmation from user 114 regarding the accuracy of the first intent determined based on the first incremental speech recognition output. For example, microphone 140/240, camera 142/242, or a touchscreen on display 250 can receive an input indicating confirmation from user 114.

Speaker determination 226 of signal processing 220 may determine a speaker corresponding to a second incremental speech recognition output in a similar manner described above. For example, speaker determination 226 may determine that user 114 corresponds to the second incremental speech recognition output. In another example, speaker determination 226 may determine that a second speaker (different from user 114 corresponding to the first incremental speech recognition output) corresponds to the second incremental speech recognition output of the first utterance. In other words, system 100/200 can incrementally determine whether a speaker change has occurred in an utterance. Intent determination 222 may determine a second intent for the first utterance based on the determined second speaker. Intent determination 222 may track both the first and second intents, for example, where the utterance is a dialogue and each speaker has corresponding intents. Intent determination 222 may update the second intent in a similar manner as the first intent. Resource retrieval 234 may retrieve a second resource from resource database 118/218 based on the second intent, and incorporation instruction 236 and resource incorporation 248 may incorporate the second resource in media content 246 being played by media module 144/244 instead of or in addition to the first resource.

End of utterance 224 of signal processing 220 may determine that a portion of an utterance is the end of the utterance. For example, by analyzing outputs from ASR 230 and/or gaze/gesture recognition 232, end of utterance 224 may determine that the second portion of the first utterance is the end of the first utterance. Intent determination 22 may utilize the output from end of utterance 224 when determining or updating an intent. For example, where intent determination 222 updated the first intent based on the first and second incremental speech recognition outputs, after end of utterance 224 determines that the second portion of the first utterance is the end of the first utterance, intent determination may update the updated first intent based on the determined end of the first utterance.

Thus, the present application discloses various implementations of systems for incremental natural language understanding, as well as methods for use by such systems. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a media module configured to play a video content;
a memory storing a software code;
a hardware processor communicatively coupled to the media module, and configured to execute the software code to:
receive an audio stream including a first utterance;
generate a first incremental speech recognition output based on a first portion of the first utterance;
generate a second incremental speech recognition output based on a second portion of the first utterance;
determine, prior to generating the second incremental speech recognition output, a first intent of the first utterance based on the first incremental speech recognition output;
retrieve a first resource from a resource database based on the determined first intent, wherein the resource database includes at least one of a voice over audio, a video or a text; and
incorporate the first resource in the video content to be played by the media module.

2. The system of claim 1, wherein:
the determined first intent of the first utterance comprises a predetermined word;
the voice over audio comprises a substitute audio file; and
the incorporating the first resource in the video content comprises substituting an audio portion of the video content including the predetermined word with the substitute audio file.

3. The system of claim 2, wherein retrieving the first resource based on the determined first intent comprises:
estimating a duration of the predetermined word in the first utterance; and
determining that a duration of the substitute audio file is approximately the duration of the predetermined word.

4. The system of claim 2, wherein:
the hardware processor is further configured to estimate a starting point of the predetermined word in the first utterance, and substitute the audio portion of the video content including the predetermined word with the substitute audio file at the estimated starting point.

5. The system of claim 1, wherein the hardware processor is further configured to:
recognize an entity in the audio stream;
extract an audio portion corresponding to the recognized entity from the audio stream; and
store the audio portion in a resource database;
wherein the incorporating the first resource in the video content includes incorporating the audio portion corresponding to the recognized entity in the video content.

6. The system of claim 1, wherein the hardware processor is further configured to:
determine a first speaker corresponding to the first incremental speech recognition output, wherein the determining the first intent of the first utterance is further based on the determined first speaker;
determine a second speaker corresponding to the second incremental speech recognition output; and
determine a second intent of the first utterance based on the determined second speaker.

7. The system of claim 1, wherein the hardware processor is further configured to update, after generating the second incremental speech recognition output, the first intent of the first utterance based on the first incremental speech recognition output and the second incremental speech recognition output.

8. The system of claim 7, wherein the hardware processor is further configured to:
determine that the second portion of the first utterance comprises an end of the first utterance; and
update the updated first intent based on the end of the first utterance.

9. The system of claim 7, wherein the hardware processor is further configured to:
retrieve a second resource based on the updated first intent; and
incorporate the second resource in the video content to be played by the media module.

10. The system of claim 1, wherein the hardware processor is further configured to:
receive video data;
generate an incremental gaze recognition output or an incremental gesture recognition output based on a portion of the video data; and
determine the first intent of the first utterance further based on the incremental gaze recognition output or the incremental gesture recognition output.

11. A method for use by a system including a media module configured to play a video content, a memory storing a software code, and a hardware processor communicatively coupled to the media module, the method comprising:
receiving, using the hardware processor, an audio stream including first utterance;
generating, using the hardware processor, a first incremental speech recognition output based on a first portion of the first utterance;
generating, using the hardware processor, a second incremental speech recognition output based on a second portion of the first utterance;
determining, prior to generating the second incremental speech recognition output and using the hardware processor, a first intent of the first utterance based on the first incremental speech recognition output;
retrieving, using the hardware processor, a first resource from a resource database based on the determined first intent, wherein the resource database includes at least one of a voice over audio, a video or a text; and
incorporating, using the hardware processor, the first resource in the video content to be played by the media module.

12. The method of claim 11, wherein:
the determined first intent of the first utterance comprises speaking a predetermined word;

the voice over audio comprises a substitute audio file; and
the incorporating the first resource in the video content comprises substituting an audio portion of the video content including the predetermined word with the substitute audio file.

13. The method of claim 12, wherein retrieving the first resource based on the determined first intent comprises:
   estimating, using the hardware processor, a duration of the predetermined word in the first utterance; and
   determining, using the hardware processor, that a duration of the substitute audio file is approximately the duration of the predetermined word.

14. The method of claim 12, further comprising:
   estimating, using the hardware processor, a starting point of the predetermined word in the first utterance; and
   substituting, using the hardware processor, the audio portion of the video content including the predetermined word with the substitute audio file at the estimated starting point.

15. The method of claim 11, further comprising:
   recognizing, using the hardware processor, an entity in the audio stream;
   extracting, using the hardware processor, an audio portion corresponding to the recognized entity from the audio stream; and
   storing, using the hardware processor, the audio portion in a resource database;
   wherein the incorporating the first resource in the video content includes incorporating the audio portion corresponding to the recognized entity in the video content.

16. The method of claim 11, further comprising:
   determining, using the hardware processor, a first speaker corresponding to the first incremental speech recognition output, wherein the determining the first intent of the first utterance is further based on the determined first speaker;
   determining, using the hardware processor, a second speaker corresponding to the second incremental speech recognition output; and
   determining, using the hardware processor, a second intent of the first utterance based on the determined second speaker.

17. The method of claim 11, further comprising updating, after generating the second incremental speech recognition output and using the hardware processor, the first intent of the first utterance based on the first incremental speech recognition output and the second incremental speech recognition output.

18. The method of claim 17, further comprising:
   determining, using the hardware processor, that the second portion of the first utterance comprises an end of the first utterance; and
   updating, using the hardware processor, the updated first intent based on the end of the first utterance.

19. The method of claim 17, further comprising:
   retrieving, using the hardware processor, a second resource based on the updated first intent; and
   incorporating, using the hardware processor, the second resource in the video content to be played by the media module.

20. The method of claim 11, further comprising:
   receiving, using the hardware processor, video data;
   generating, using the hardware processor, an incremental gaze recognition output or an incremental gesture recognition output based on a portion of the video data; and
   determining, using the hardware processor, the first intent of the first utterance further based on the incremental gaze recognition output or the incremental gesture recognition output.

* * * * *